United States Patent
Miller

[11] 3,834,560
[45] Sept. 10, 1974

[54] POLE HOLDING AND SETTING DEVICE

[76] Inventor: Arthur G. Miller, 165 McNab Cres., Regina, Saskatchewan, Canada

[22] Filed: May 8, 1973

[21] Appl. No.: 358,333

[30] Foreign Application Priority Data
May 11, 1972 Canada .................................. 141849

[52] U.S. Cl. .......................... 214/3, 212/42, 212/47, 212/58 R, 214/77 R, 214/147 R
[51] Int. Cl. .............................................. B66f 11/02
[58] Field of Search ..... 214/77, 3, 149, 1 D, 147 R, 214/147 G, 151, 1 R; 212/47, 144, 33, 3 S, 41, 42, 43, 44, 57, 58 R, 59

[56] References Cited
UNITED STATES PATENTS
| | | | |
|---|---|---|---|
| 351,805 | 11/1886 | Service | 212/47 |
| 3,333,717 | 8/1967 | Scaperotto | 214/147 G |
| 3,646,976 | 3/1972 | McColl | 214/3 X |

Primary Examiner—Frank E. Werner
Attorney, Agent, or Firm—Stanley G. Ade

[57] ABSTRACT

A frame is mounted on a truck or the like and includes a pair of opposed pole supporting boom assemblies. Means are provided to adjust the relationship between the poles held by the assemblies and to straighten them so that they lie perpendicular to the horizontal. Means are also provided to align one pole with the other prior to tamping them in position in the holes pre-formed in the ground.

24 Claims, 4 Drawing Figures

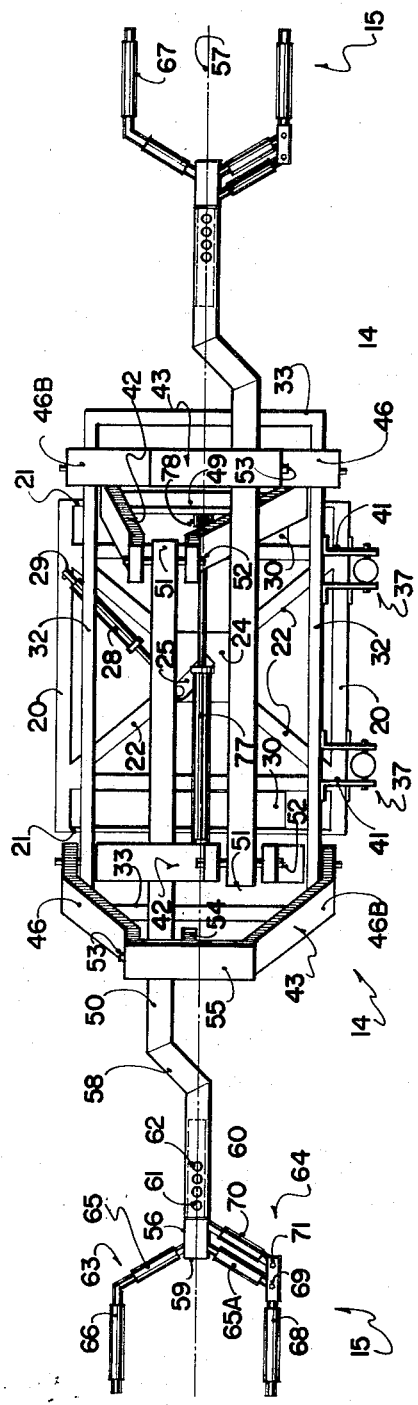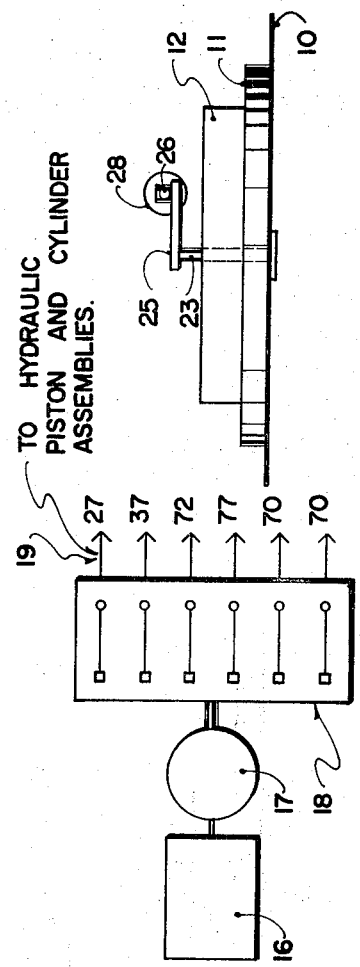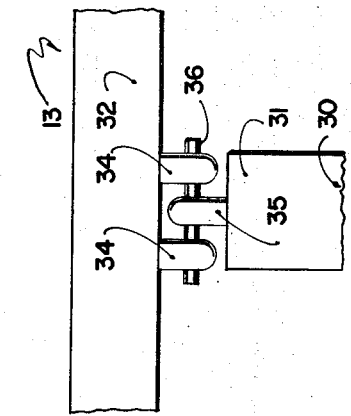

POLE HOLDING AND SETTING DEVICE

BACKGROUND OF THE INVENTION

It is conventional to mount power line poles or the like in spaced and parallel relationship one with the other particularly when a relatively heavy line load is to be carried or high wind conditions may be encountered.

Normally vertical holes are drilled into the ground to receive the poles at the required spacing and then these poles are engaged with the holes which are then tamped full of soil in order to hold the poles in position. However, it is necessary that the poles be perpendicular to the horizontal and be parallel one with the other and this is usually accomplished by supporting the poles on two or three sides by means of diagonally extending support poles commonly known as "pike poles." It is difficult and time consuming to ensure that the two poles are spaced and parallel and are perpendicular in both directions with the horizontal prior to tamping so that labor costs are excessive in placing such poles.

Although the present invention is designed specifically to support and align a pair of spaced and parallel poles, nevertheless it will be appreciated that it can be used satisfactorily to set a single pole perpendicular with the horizontal.

SUMMARY OF THE INVENTION

The present invention overcomes disadvantages inherent with conventional methods of setting poles by providing a mobile unit which will hold the poles in the holes and which includes means to adjust the poles together or independently so that they stand vertical to the horizontal and parallel one with the other.

A further object of the invention is to provide a device of the character herewithin described in which the device can be rotated in a horizontal plane, can be tilted within limits relative to the horizontal, and which includes means to hold a pair of poles in spaced and parallel relationship at varying distances apart from one another, also within limits.

Still another object of the invention is to provide a device of the character herewithin described in which a pair of poles, once set in the holes, can be aligned vertically or perpendicularly and parallel to one another rapidly and easily prior to the tamping operation.

A yet other object of the invention is to provide a device of the character herewithin described which is simple in construction, economical in manufacture, and otherwise well suited to the purpose for which it is designed.

With the foregoing objects in view, and other such objects and advantages as will become apparent to those skilled in the art to which this invention relates as this specification proceeds, my invention consists essentially in the arrangement and construction of parts all as hereinafter more particularly described, reference being had to the accompanying drawings in which:

DESCRIPTION OF THE DRAWINGS

FIG. 2 is an enlarged fragmentary view showing the method of pivotting the sub frame to the main frame, taken substantially along the line 2—2 of FIG. 1.

FIG. 3 is a partially schematic view of the main frame, sub frame and rotating mechanism together with a schematic view of the hydraulic power source.

FIG. 4 is a partial top plan view of the boom assemblies.

In the drawings like characters of reference indicate corresponding parts in the different figures.

PRELIMINARY DESCRIPTION

Figure 1:
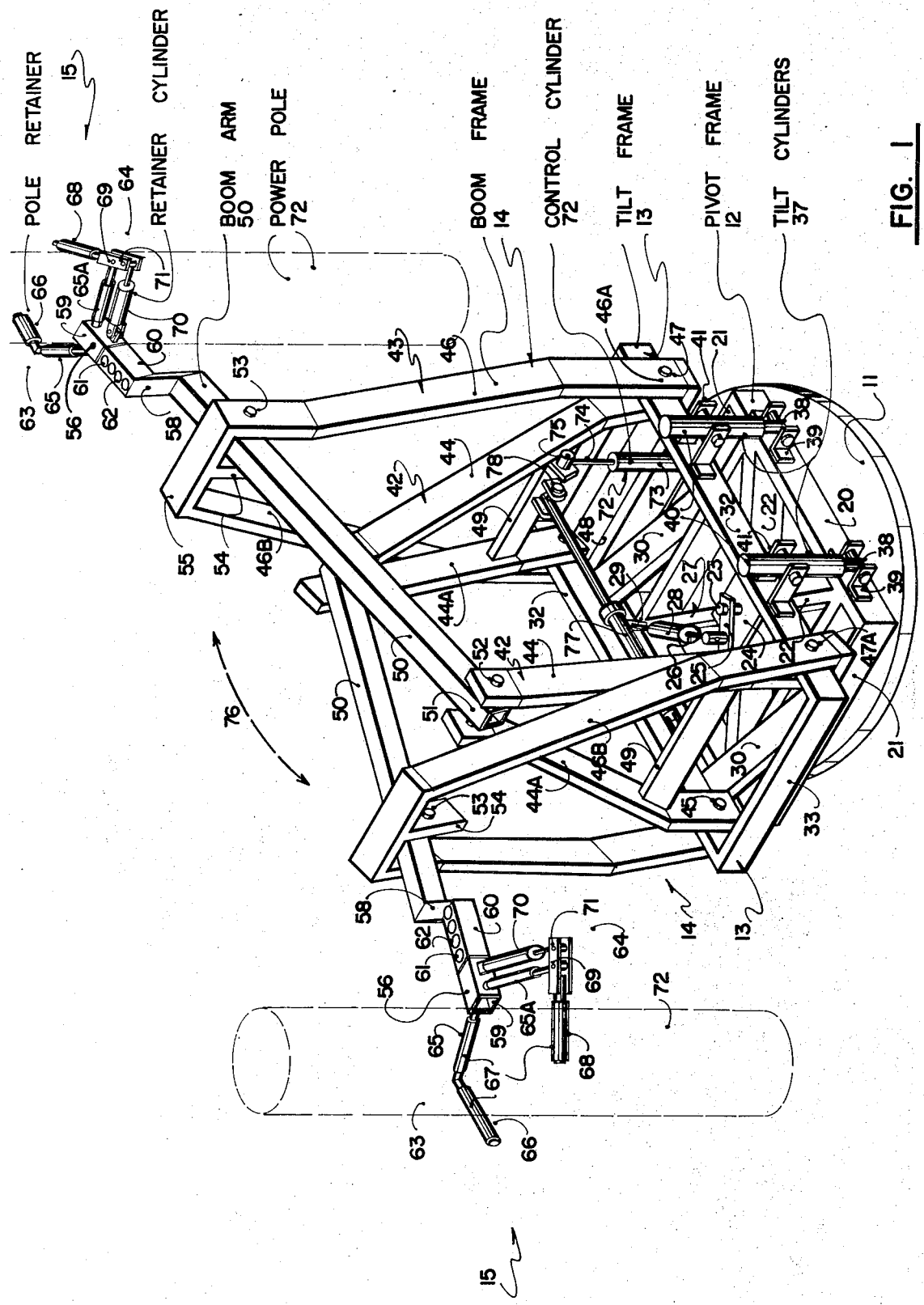
FIG. 1 is an isometric view of the device per se.

The device consists primarily of a supporting surface 10 upon which a turntable plate 11 is situated. A base frame collectively designated 12 is rotatable upon the turntable and a sub frame collectively designated 13 is pivotally mounted for tilting action to the base frame. Extending upwardly from the sub frame is a pair of boom assemblies collectively designated 14 extending one upon each side thereof, each of said boom assemblies including pole retaining means collectively designated 15.

DETAILED DESCRIPTION

Proceeding therefore to describe the invention in detail, reference character 10 in FIG. 3 illustrates a supporting surface which may take the form of a truck or other mobile unit. Mounted upon the truck is the aforementioned turntable 11 which consists of a plate secured to the truck bed and also mounted on the truck is a source of power 16 driving an hydraulic pump 17 which in turn is operatively connected to an hydraulic valve control assembly 18. Individual hydraulic lines 19 extend from this valve assembly to the various piston and cylinder assemblies hereinafter to be described.

The base frame generally designated 12 includes a pair of spaced and parallel longitudinal girder members 20 together with cross members 21 and diagonal braces 22 all of which provide a relatively strong and rigid base frame. This base frame is rotatable upon the turntable plate 11 and in this connection a fixed spindle 23 extends from the support surface 10, upwardly through the turntable plate 11 and freely through a plate 24 mounted centrally upon the interaction of the diagonal brace members 22 as clearly shown in FIGS. 1 and 3. An offset crank 25 is secured by one end thereof to the fixed spindle 23 and is pivotally secured by the other end thereof to the piston rod 26 on an hydraulic piston and cylinder assembly collectively designated 27 and operatively connected to the control valve assembly 18. The cylinder 28 of this assembly 27 is pivotally connected to a lug 29 situated on one of the longitudinal members 20 so that extension and retraction of this piston and cylinder assembly 27 will cause the base frame 12 to rotate in partial circle relative to the fixed turntable plate 11. This enables the entire device to be aligned with the longitudinal axis of the truck for transportation purposes but to be turned at right angles thereto when the device is ready for use.

A pair of diagonally extending support members 30 extend upwardly from the outer cross members 21 of the base frame 12 to adjacent one side longitudinal member 20 and pivotally secured to the distal ends 31 of these members 30 is the sub frame collectively designated 13.

This sub frame includes a pair of spaced and parallel longitudinal members 32 together with cross members 33 thus forming a substantially rectangular sub frame and reference to FIG. 2 will show that a pair of lugs 34 are secured to the underside of one of the longitudinal members 32 of the sub frame and a single lug 35 is secured to the distal end 31 of the members 30. Pivot pin 36 extends through the lugs and mounts the sub frame for vertical tilting movement relative to the base frame, said sub frame being mounted to the base frame adjacent one side thereof.

A pair of piston and cylinder assemblies collectively designated 37 each includes piston rods 38 pivotally connected within brackets 39 secured to the base frame longitudinal member 20, together with a cylinder 40 pivotally connected intermediate the ends thereof between pairs of lugs 41 extending from the longitudinal side member 32 of the sub frame. These are also connected to the control valve assembly 18 and it will be seen that extension or retraction of these piston and cylinder assemblies 37 tilts the sub frame upwardly or downwardly relative to the base frame 12.

The two boom assemblies 14 each include a first frame 42 and a second frame 43.

The first frame 42 includes the upwardly and inwardly inclining frame members 44 each of which is pivotally secured by the lower ends thereof to adjacent the ends of the longitudinal members 32 of the sub frame and upon the inner sides thereof, by means of pivot pins 45.

The second frame 43 each include upwardly and inwardly inclining frame members 46 which are pivotally secured by the lower ends thereof also to the longitudinal members 32 adjacent the ends thereof but on the outer surfaces thereof, by means of pivot pins 47 and it will be observed that the second frames are slightly higher than the first frames.

The lower ends 46A of the frame members 46 extend below the undersides of the longitudinal members 32 of the sub frames so that a cross member 48 can extend between these lower ends for bracing purposes. Cross brace members 49 extend between the members 44 of the first frames 42 as clearly shown and are also for bracing purposes.

A longitudinally extending boom arm 50 is pivotally secured by the inner end 51 thereof between the upper ends of the first frame members 46, by means of pivot pin 52.

This boom arm 50 is also pivoted between the upper ends of the second frame members 46 by means of a pivot pin 53 extending through one of the frame members and a depending support member 54 which extends downwardly from an upper cross member 55 extending across the upper ends of the frame members 46.

The angulation of one of the frame members 44A of the first frames and the angulation of one of the frame members 46B of the second frame permits the two boom arms 50 to pass one another as they are moved inwardly and outwardly as will hereinafter be described and in order to bring the boom arm distal ends 56 back into alignment or so that they lie on the same longitudinal axis 57, these boom arms are offset oppositely outboard of the second frames as clearly indicated by reference character 58.

Mounted upon the distal end of the boom arms 50 are the pole retainer assemblies 15 and these distal end portions 59 of the boom arms are formed so that they telescope within the end portions 60 of the boom arms, being held in position by means of a pin 61 which engages through any one of a plurality of holes 62 in the portion 60 and through one hole (not illustrated) within the distal end 59. This permits limited endwise adjustment of the length of the boom arms 50.

The pole retainer assemblies 15 include an angulated fixed jaw 63 and an angulated movable jaw 64. The fixed jaw 63 includes an inner member 65 which is secured to the end of the boom arm and extends outwardly therefrom as clearly shown. An outer member 66 is welded to the distal end of the inner member 65 and is angulated with respect thereto as clearly illustrated and these members are preferably covered with rubber sleeves 67 for gripping purposes.

The movable jaw 64 also includes an inner member 65A which extends from the distal end 59 at an angle opposite to the member 65 of the fixed jaw.

An outer member 68 is pivotted to the distal end of the inner member 65A by means of pivot pin 69 and an hydraulic piston and cylinder assembly 70 extends between the distal end 59 of the boom arm and a pivot connection 71 on the outer arm 68 and this piston and cylinder assembly is also operatively connected to the control valve assembly 18 hereinbefore described. It will be seen that the angulation and situation of the fixed and movable jaws is such that they can engage around a power pole 72 and that by actuation of the piston and cylinder assembly 70, the outer member 68 of the movable jaw can engage around the pole and embrace same so that it can be held firmly.

Means are provided to move the boom assemblies 14 to one side or the other either together or independently one from the other.

An hydraulic piston and cylinder assembly 72 is pivotally secured by one end of the cylinder 73, to one of the longitudinal members 32 of the sub frame 13 and this piston and cylinder assembly extends diagonally upwardly so that the piston rod 74 may be pivotally connected to a frame member 44 of one of the first frames 42 of the assemblies, pivot pin 75 providing this connection as clearly shown in FIG. 1.

This piston and cylinder assembly 72 is also connected to the control valve assembly 18 so that extension or retraction of this piston and cylinder assembly will move both boom assemblies 14 inwardly or outwardly relative to the sub frame or upon one side or the other. The arcuately curved double headed arrow 76 indicates this movement, it being understood that the assemblies pivot on the pivot pins 47 and 47A and 45.

A further piston and cylinder assembly 77 extends between the cross members 49 of each of the first frame assemblies 42 and this piston and cylinder assembly lies substantially horizontally and is pivotally connected by one end by means of pivot pin 78 and by the other end by a similar pivot pin (not illustrated).

This piston and cylinder assembly is also connected to the hydraulic control valve assembly 18 and it will be seen that extension and retraction of this piston and cylinder assembly 77 will cause the boom assemblies 14 to move towards or away from one another once again pivotting upon pivot pins 47 and 47A which engages the boom assemblies to the sub frame 13.

In operation, the holes are first dug (not illustrated) and the poles 72 set loosely into the holes. The truck or other supporting platform is moved between the poles and piston and cylinder assembly 27 is actuated to rotate the entire base frame together with the sub frame and boom assemblies, to a position where the boom assemblies are directed towards the two poles 72.

The piston and cylinder assemblies 70 are now actuated to open the pole retainer jaws to the widest position whereupon the control piston and cylinder assembly 72 is actuated to move both assemblies in one direction so that the pole retaining jaws on one of the assemblies can engage around one of the poles 72. The retaining piston and cylinder assembly 70 of this particular set of jaws is then actuated to close the jaws around the pole thus grasping it firmly.

The horizontal adjusting piston and cylinder assembly 77 is now actuated to move the opposite assembly into engagement with the other pole 72 whereupon its retaining piston and cylinder assembly is actuated thus causing the jaws of this assembly to grasp the other pole firmly.

The adjusting piston and cylinder assembly 77 is once again actuated to move the poles together or apart so that they are the correct distance apart and are situated vertically one with the other whereupon the control piston and cylinder assembly 72 may be actuated to straighten the poles so that they are not only parallel one with the other but also perpendicular to the horizontal in one direction.

The tilt piston and cylinder assemblies 37 may then be actuated to straighten both poles to the perpendicular position in the other direction or right angles to the first direction whereupon the pivotting piston and cylinder assembly 27 may be used in order to twist the poles into alignment one with the other if necessary.

It will be appreciated that all of the piston and cylinder assemblies hereinbefore described may be used to give the final adjustment to the position of the two poles whereupon they may be tamped into position in the desired relationship one with the other and perpendicular to the horizontal surface.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. A pole holding and setting device adapted to be mounted on supporting structure such as a truck or the like which includes a source of hydraulic power, said device being adapted for use with power poles and the like which have to be set into prepared holes in the ground, in spaced and parallel relationship one with the other and perpendicular to the horizontal; said device comprising in combination a base frame, a sub frame pivotally mounted for tilting movement by one side thereof to one side of said base frame, means to tilt said sub frame relative to said base frame, a pair of boom assemblies pivotally mounted on and extending upwardly from said sub frame, one on each side thereof, one of said boom assemblies extending upon one side of said sub frame and the other of said boom assemblies extending upon the opposite side of said sub frame, pole retaining assemblies on each of said boom assemblies, means to activate said pole retaining assemblies, means to move said boom assemblies in one direction or the other together and further means to move one of said boom assemblies towards or away from the other of said boom assemblies.

2. The device according to claim 1 which includes means to rotate said sub frame through part of a circle, and in a horizontal plane relative to said base frame.

3. The device according to claim 2 in which said means to tilt said sub frame relative to said base frame includes a pair of spaced and parallel members extending diagonally upwardly from said base frame, and at least one hydraulic piston and cylinder assembly operatively connected between the other side of said base frame and the other side of said sub frame.

4. The device according to claim 3 in which each of said boom assemblies includes a first frame and a second frame, said frames being pivotted by the lower ends thereof to adjacent the ends of said sub frame, and a boom arm pivotally connected between the upper ends of said frames and extending beyond said second frame.

5. The device according to claim 4 in which said means to move said boom assemblies together includes a hydraulic piston and cylinder assembly operatively extending between said base frame and one of said first frames of said boom assemblies, said means to move said one boom assembly relative to the other boom assembly including a hydraulic piston and cylinder assembly operatively extending between said boom assemblies and lying substantially horizontal, said piston and cylinder assemblies being operatively connected to said source of hydraulic power.

6. The device according to claim 5 in which said pole retaining assemblies include a fixed angulated retaining jaw extending from the distal end of said boom assembly, a movable opposed angulated jaw extending also from the distal end of said boom assembly, said jaws lying in the same plane, and an hydraulic piston and cylinder assembly operatively connected between said boom assembly and said movable jaw to move said movable jaw towards and away from said fixed jaw, each of said jaws including an inner member and an outer member in angulated relationship one with the other, said jaws being mounted on said boom arm, said boom arm being telescopic for limited length adjustment.

7. The device according to claim 4 in which said pole retaining assemblies include a fixed angulated retaining jaw extending from the distal end of said boom assembly, a movable opposed angulated jaw extending also from the distal end of said boom assembly, said jaws lying in the same plane, and an hydraulic piston and cylinder assembly operatively connected between said boom assembly and said movable jaw to move said movable jaw towards and away from said fixed jaw, each of said jaws including an inner member and an outer member in angulated relationship one with the other, said jaws being mounted on said boom arm, said boom arm being telescopic for limited length adjustment.

8. The device according to claim 3 in which said means to move said boom assemblies together includes a hydraulic piston and cylinder assembly operatively extending between said base frame and one of said first frames of said boom assemblies, said means to move said one boom assembly relative to the other boom assembly including a hydraulic piston and cylinder assembly operatively extending between said boom assemblies and lying substantially horizontal, said piston and cylinder assemblies being operatively connected to said source of hydraulic power.

9. The device according to claim 8 in which said pole retaining assemblies include a fixed angulated retaining jaw extending from the distal end of said boom assembly, a movable opposed angulated jaw extending also from the distal end of said boom assembly, said jaws lying in the same plane, and an hydraulic piston and cylinder assembly operatively connected between said boom assembly and said movable jaw to move said movable jaw towards and away from said fixed jaw, each of said jaws including an inner member and an outer member in angulated relationship one with the other.

10. The device according to claim 3 in which said pole retaining assemblies include a fixed angulated retaining jaw extending from the distal end of said boom assembly, a movable opposed angulated jaw extending also from the distal end of said boom assembly, said jaws lying in the same plane, and an hydraulic piston and cylinder assembly operatively connected between said boom assembly and said movable jaw to move said movable jaw towards and away from said fixed jaw, each of said jaws including an inner member and an outer member in angulated relationship one with the other.

11. The device according to claim 2 in which each of said boom assemblies includes a first frame and a second frame, said frames being pivotted by the lower ends thereof to adjacent the ends of said sub frame, and a boom arm pivotally connected between the upper ends of said frames and extending beyond said second frame.

12. The device according to claim 11 in which said means to move said boom assemblies together includes a hydraulic piston and cylinder assembly operatively extending between said base frame and one of said first frames of said boom assemblies, said means to move said one boom assembly relative to the other boom assembly including a hydraulic piston and cylinder assembly operatively extending between said boom assemblies and lying substantially horizontal, said piston and cylinder assemblies being operatively connected to said source of hydraulic power.

13. The device according to claim 2 in which said means to move said boom assemblies together includes a hydraulic piston and cylinder assembly operatively extending between said base frame and one of said first frames of said boom assemblies, said means to move said one boom assembly relative to the other boom assembly including a hydraulic piston and cylinder assembly operatively extending between said boom assemblies and lying substantially horizontal, said piston and cylinder assemblies being operatively connected to said source of hydraulic power.

14. The device according to claim 1 in which said means to tilt said sub frame relative to said base frame includes a pair of spaced and parallel members extending diagonally upwardly from said base frame, and at least one hydraulic piston and cylinder assembly operatively connected between the other side of said base frame and the other side of said sub frame.

15. The device according to claim 14 in which each of said boom assemblies includes a first frame and a second frame, said frames being pivoted by the lower ends thereof to adjacent the ends of said sub frame, and a boom arm pivotally connected between the upper ends of said frames and extending beyond said second frame.

16. The device according to claim 15 in which said means to move said boom assemblies together includes a hydraulic piston and cylinder assembly operatively extending between said base frame and one of said first frames of said boom assemblies, said means to move said one boom assembly relative to the other boom assembly including a hydraulic piston and cylinder assembly operatively extending between said boom assemblies and lying substantially horizontal, said piston and cylinder assemblies being operatively connected to said source of hydraulic power.

17. The device according to claim 14 in which said means to move said boom assemblies together includes a hydraulic piston and cylinder assembly operatively extending between said base frame and one of said first frames of said boom assemblies, said means to move said one boom assembly relative to the other boom assembly including a hydraulic piston and cylinder assembly operatively extending between said boom assemblies and lying substantially horizontal, said piston and cylinder assemblies being operatively connected to said source of hydraulic power.

18. The device according to claim 1 in which each of said boom assemblies includes a first frame and a second frame, said frames being pivotted by the lower ends thereof to adjacent the ends of said sub frame, and a boom arm pivotally connected between the upper ends of said frames and extending beyond said second frame.

19. The device according to claim 18 in which said means to move said boom assemblies together includes a hydraulic piston and cylinder assembly operatively extending between said base frame and one of said first frames of said boom assemblies, said means to move said one boom assembly relative to the other boom assembly including a hydraulic piston and cylinder assembly operatively extending between said boom assemblies and lying substantially horizontal, said piston and cylinder assemblies being operatively connected to said source of hydraulic power.

20. The device according to claim 19 in which said pole retaining assemblies include a fixed angulated retaining jaw extending from the distal end of said boom assembly, a movable opposed angulated jaw extending also from the distal end of said boom assembly, said jaws lying in the same plane, and an hydraulic piston and cylinder assembly operatively connected between said boom assembly and said movable jaw to move said movable jaw towards and away from said fixed jaw, each of said jaws including an inner member and an outer member in angulated relationship one with the other, said jaws being mounted on said boom arm, said boom arm being telescopic for limited length adjustment.

21. The device according to claim 18 in which said pole retaining assemblies include a fixed angulated retaining jaw extending from the distal end of said boom assembly, a movable opposed angulated jaw extending also from the distal end of said boom assembly, said jaws lying in the same plane, and an hydraulic piston and cylinder assembly operatively connected between said boom assembly and said movable jaw to move said movable jaw towards and away from said fixed jaw, each of said jaws including an inner member and an outer member in angulated relationship one with the other, said jaws being mounted on said boom arm, said boom arm being telescopic for limited length adjustment.

22. The device according to claim 1 in which said means to move said boom assemblies together includes a hydraulic piston and cylinder assembly operatively extending between said base frame and one of said first frames of said boom assemblies, said means to move said one boom assembly relative to the other boom assembly including a hydraulic piston and cylinder assembly operatively extending between said boom assemblies and lying substantially horizontal, said piston and cylinder assemblies being operatively connected to said source of hydraulic power.

23. The device according to claim 22 in which said pole retaining assemblies include a fixed angulated retaining jaw extending from the distal end of said boom assembly, a movable opposed angulated jaw extending also from the distal end of said boom assembly, said jaws lying in the same plane, and an hydraulic piston and cylinder assembly operatively connected between said boom assembly and said movable jaw to move said movable jaw towards and away from said fixed jaw, each of said jaws including an inner member and an outer member in angulated relationship one with the other.

24. The device according to claim 1 in which said pole retaining assemblies include a fixed angulated retaining jaw extending from the distal end of said boom assembly, a movable opposed angulated jaw extending also from the distal end of said boom assembly, said jaws lying in the same plane, and an hydraulic piston and cylinder assembly operatively connected between said boom assembly and said movable jaw to move said movable jaw towards and away from said fixed jaw, each of said jaws including an inner member and an outer member in angulated relationship one with the other.

* * * * *